United States Patent Office
3,105,148
Patented Sept. 24, 1963

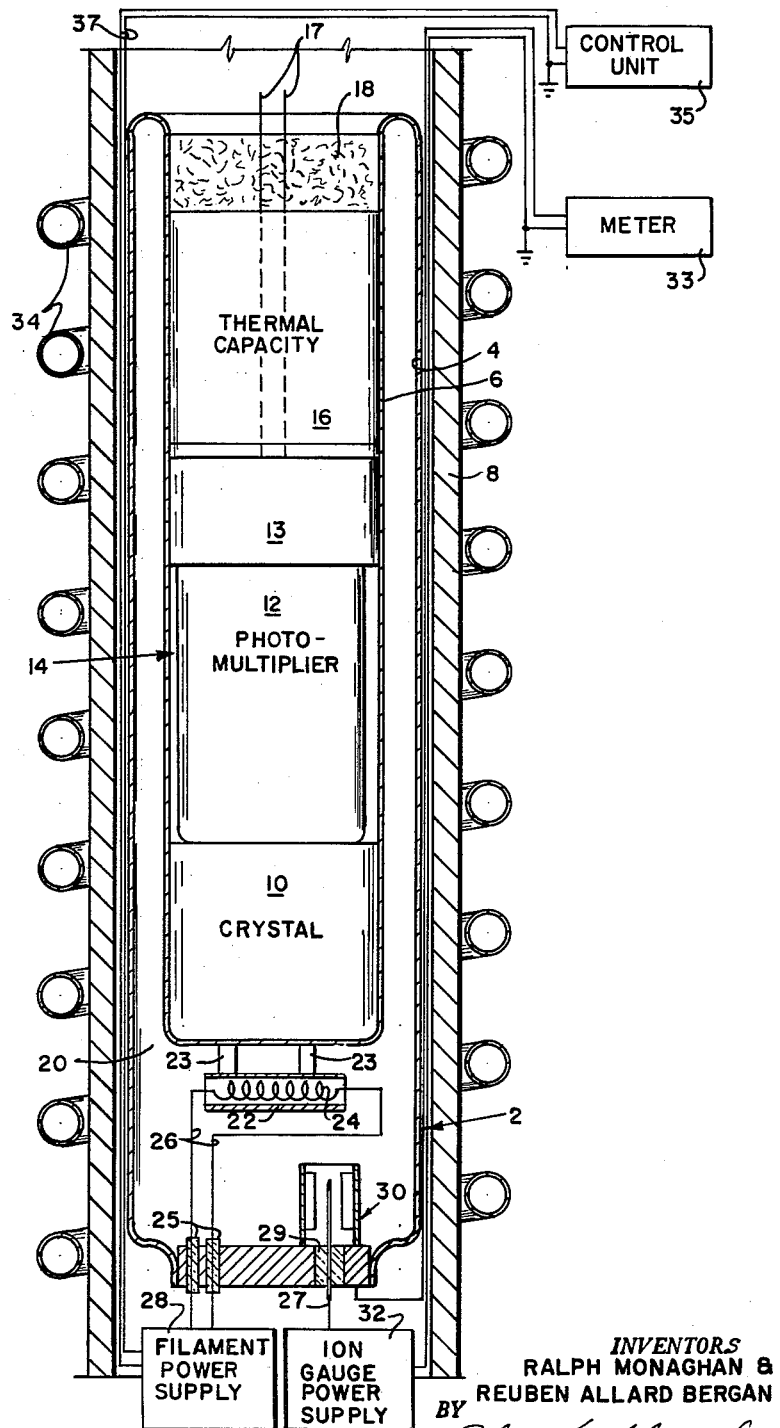

3,105,148
VARIABLE THERMAL-CONDUCTANCE VACUUM-WALLED CONTAINER FOR SCINTILLATION DETECTORS
Ralph Monaghan and Reuben A. Bergan, Tulsa, Okla., assignors to Well Surveys, Inc., a corporation of Delaware
Filed Feb. 26, 1960, Ser. No. 11,258
9 Claims. (Cl. 250—71.5)

This invention relates to double-walled vacuum flasks and is particularly directed to novel method and apparatus for varying the rate of heat transfer between the walls of double-walled vacuum flasks.

In the art of nuclear well logging, a subsurface instrument containing complex electronic circuitry is suspended in a borehole by means of a cable which also serves to transmit electrical signals and power between the subsurface instrument and suitable recording equipment at the surface of the earth. During well logging operations, the subsurface instrument may encounter borehole temperatures as high as 400 degrees Fahrenheit. Under such conditions, many electronic components, such as photomultiplier tubes, may be adversely affected or may actually fail. Accordingly, it has been the practice to provide thermal insulation and refrigeration for such components, as taught by the patent to Reuben A. Bergan, Patent No. 2,711,084. Unfortunately, the limited power available, the high borehole temperatures and the dimensional limitations imposed by the borehole make it impractical to employ mechanical refrigeration systems within the subsurface instrument.

Numerous methods and apparatus have been proposed heretofore to accomplish refrigeration. Thus, it has been suggested to employ ice inside of the vacuum flask to cool the electronic components contained in the flask. However, this requires either that the instrument be disassembled prior to each logging operation to insert a new supply of ice or that a water bottle be mounted in the flask and some means be provided to freeze the water. None of the prior art methods have been entirely satisfactory. It is undesirable to open the instrument repeatedly, since the instrument housing must be pressure sealed and the seal is broken each time the instrument is opened to add ice. Moreover, the connections between the electronic components are fragile and may be broken by the handling involved in opening and closing. Where attempts are made to provide refrigeration equipment in the subsurface instrument, considerable space is required and a problem is presented of dissipating the heat of the refrigeration process. Furthermore, the couplings and other components of the refrigeration apparatus must be made sufficiently rugged to withstand the severe mechanical shocks which the subsurface instrument encounters during well logging operations.

These disadvantages of the prior art are overcome with the present invention and novel methods and apparatus are provided whereby a high rate of heat transfer between the walls of a double-walled vacuum flask is permitted during freezing operations and a very low rate of heat transfer is obtained thereafter. Thus, the thermal mass within the flask may be frozen much more rapidly, without the equipment taught by the prior art.

The advantages of the present invention are preferably attained by providing a reservoir of gas communicating with the space between the walls of a double-walled vacuum flask together with means for releasing said gas into and removing said gas from said space at will. In this way, the gas may be released into the space between the walls of a double-walled vacuum flask during freezing operations to facilitate heat transfer out of the inner compartment of the flask and thereby enhance the rate of freezing. When the freezing operation is completed, the gas is moved from said space to provide a high vacuum between said walls and thus hold heat transfer to a minimum during the logging operations. Furthermore, each time the gas reservoir is energized, any accumulated getterable gases such as oxygen, nitrogen, CO and $CO_2$, are permanently absorbed.

Accordingly, it is an object of the present invention to provide novel methods and apparatus for varying the rate of heat transfer between the walls of a double-walled vacuum flask and to provide means for scavenging permanently getterable gases that evolve from the walls of the flask.

Another object of the present invention is to provide novel methods and apparatus for refrigerating and insulating electronic components in a subsurface well logging instrument.

A specific object of the present invention is to provide novel means for varying the rate of heat transfer between the walls of a double-walled vacuum flask, said means comprising a reservoir containing a quantity of gas, and means for releasing said gas into and removing said gas from said space at the will of the operator.

Another specific object of the present invention is to provide a novel method for varying the rate of heat transfer between the walls of a double-walled vacuum flask, said method comprising the steps of releasing a quantity of gas into said space, refrigerating said flask, and evacuating said space.

These and other objects and features of the present invention will be apparent from the following detailed description wherein reference is made to the FIGURE of the accompanying drawing.

In the drawing:

The figure is a view, partly in section, of a typical double-walled vacuum flask embodying the present invention shown as part of a subsurface well logging instrument. In that form of the invention chosen for purposes of illustration in the drawing, the figure shows a double-walled vacuum flask 2 having inner and outer walls 4 and 6 respectively joined at their upper ends. The flask 2 is mounted within the pressure resistant housing 8 of a subsurface well logging instrument and has a scintillation crystal 10 and photomultiplier tube and socket 12 and 13 respectively positioned within the inner chamber 14 of the flask 2 for protection against high temperature. A body of water or other thermal mass 16 is also located within the inner chamber 14 and an insulating plug 18 seals the open end of the chamber 14. Leads 17 from photomultiplier tube socket 13 are passed through thermal mass 16 and insulating plug 18 in a conventional manner to connect to circuitry outside of flask 2. In addition, the space 20 between walls 4 and 6 is evacuated to a pressure of about $10^{-4}$ millimeters of mercury to prevent conductive heat transfer between the walls 4 and 6 and, thus, insulate the inner chamber 14.

In order to vary the rate of heat transfer between walls 4 and 6 of the flask 2, a reservoir of gas is provided together with means for releasing said gas into and moving said gas from the space between the walls of the flask. As seen in the figure, the reservoir is a tube 22 formed of titanium, zirconium, or other suitable material which will absorb gas when heated to one temperature range and will give off gas when heated to another temperature range. The tube 22 has a quantity of gas, such as hydrogen, contained in or on the material of the tube 22 and the gas may be bound to the material of tube 22 either chemically or mechanically or both. Preferably, tube 22 is attached by thermal insulator 23 to the colder surface so that the hydrogen is not released by environmental increase in temperature. A filament 24 is mounted inside of the tube 22 and is connected by suitable leads 26 through insulator 25 to a filament power supply 28 which is mounted outside of the flask 2. Power supply 28 is preferably a variable output power supply. Power supply 28 may be energized by a control unit 35 in the external equipment over conductor 37. Specific apparatus for effecting such controls will be apparent to those skilled in the art.

The titanium or zirconium has the inherent property of absorbing hydrogen when in a particular temperature range and desorbing hydrogen when at a higher temperature. At the same time it absorbs other gases at both temperatures. Hydrogen is preferred as the filling gas because of its unique high heat transfer properties.

Each time the gas control element 24 is energized, the tube 22 is heated to a temperature such that it getters gases such as oxygen, nitrogen, carbon dioxide and carbon monoxide. These gases are normally evolved from the walls of any evacuated metal container and, if not regularly scavenged, would accumulate and degrade the heat-insulating value of the device.

With this arrangement, the space 20 between the walls 4 and 6 is evacuated using an external vacuum pump, during manufacture, to a pressure of less than $10^{-5}$ millimeters of mercury and the flask is sealed. Thereafter, when it is desired to rapidly cool objects, such as the crystal 10, photomultiplier tube 12, and thermal mass 16, contained in the inner chamber 14 of the flask 2, current from power supply 28 is applied to the filament 24 to heat tube 22 sufficiently to drive gas out of the material of tube 22. The gas will spread rapidly to all parts of the space 20 and will serve to enhance the rate of heat transfer between the walls 4 and 6 of the flask 2. Thus, the articles in the inner chamber 14 may be cooled rapidly by inserting the housing 8 into refrigerating coils 34 or packing it in ice, or other suitable coolant. When the articles in the inner chamber 14 of the flask 2 have been cooled to a desired temperature, the output of power supply 28 is reduced to cause filament 24 to adjust the temperature of tube 22 so as to cause the material of tube 22 to absorb the gas. This restores the vacuum in space 20 which then serves to prevent or greatly restrict heat transfer between walls 4 and 6 of the flask 2. Consequently, the articles in inner chamber 14 can be maintained at the desired temperature for long periods of time in spite of extreme changes of temperature external of the flask 2. To determine the gas pressure and also to continuously scavenge residual gas in the space 20, an ion gauge 30, such as a Penning gauge, is provided and is energized over lead 27 through insulator 29 by a suitable power supply 32. The signal from gauge 30 is applied over conductor 31 to meter 33. An operator may observe meter 33 in order to determine operation of control unit 35.

The gauge 30 is continuously energized from the source of power 32 within the instrument. Meter 33 indicates the hydrogen pressure within the range of $5 \times 10^{-1}$ mm. Hg to $10^{-5}$ mm. Hg. Thus upon heating the hydrogen-containing metal tube 22 the gauge current indicated by meter 33 increases to $5 \times 10^{-1}$ mm. Hg and then ceases to draw current. Upon cooling of the said metal, the gauge will again draw current as the pressure drops below $5 \times 10^{-1}$ mm. Hg and will continue to indicate the hydrogen pressure. The gauge will also act as a pump, however, to scavenge hydrogen that may be evolved from the container surfaces and maintain the hydrogen pressure in space 20 at less than $10^{-4}$ mm. Hg.

To employ the device of the present invention in a well logging instrument, the scintillation crystal 10, photomultiplier tube 12 and socket 13 and thermal mass 16 are placed in the inner chamber 14 of the flask 2 and the open end of the chamber 14 is sealed with insulating plug 18. Thereafter, current from power supply 28 is applied to filament 24 to heat tube 22 to a temperature at which hydrogen is released into the space 20 between walls 4 and 6 of the flask 2. The instrument is then refrigerated by insertion into refrigeration coils 34, solid carbon dioxide packed around the instrument or other suitable means and the gas released from tube 22 enhances the rate of heat transfer by providing conduction and convection paths between the walls 4 and 6 of the flask 2. When the temperature inside the inner chamber 14 has been reduced to a desired extent, the current from power supply 28 is reduced to lower the temperature of filament 24 and tube 22 to the range in which tube 22 will re-absorb the gas from space 20. When ion gauge 30 indicates that the gas pressure has been sufficiently reduced, the instrument is ready for logging the hot well and the vacuum in space 20 will serve as thermal insulation and will maintain the articles in inner chamber 14 at a substantially constant low temperature despite extreme temperature excursions external of the instrument. After the well has been logged and the temperature in the inner chamber 14 has risen above a desired level, the instrument may be refrigerated, in the same manner, as often as desired. Each heating of the gas reservoir serves to clean up getterable gases, such as oxygen.

While the method and apparatus of the present invention have been described supra in connection with maintaining the inner chamber 14 at a low temperature, it will be apparent that the invention would be equally useful for maintaining the inner chamber 14 at a temperature above that external of the flask 2. Thus, the invention essentially comprises a heat transfer regulator which may be actuated to enhance or restrict the rate of heat transfer at the will of the operator. Moreover, it is possible, with the apparatus of the present invention, to vary and control the flow of heat between walls 4 and 6 at any desired rate between the maximum, when all of the gas is released from tube 22, and the minimum, when all of the gas is absorbed in tube 22.

In addition, while the gas reservoir has been shown as a tube 22, which releases and absorbs gas under the control of filament 24, it will be apparent that other means could be used where convenient. Further, the container need not be in the form of a flask. The invention contemplates the use of any container, including spheres, tubes and pipes, in which heat is transferred between the contents and the exterior through a space into which gas is introduced to permit heat transfer and from which gas is evacuated to inhibit heat transfer.

Moreover, numerous other variations and modifications of the present invention may obviously be made without departing from the invention. Accordingly, it should be clearly understood that the form of the invention described above and shown in the figure of the accompanying drawing is illustrative only and is not intended to limit the scope of the invention.

We claim:

1. A container having variable thermal conductance between its interior and its exterior, comprising a sealed chamber, gas reservoir means including a gas containing material which emits gas when heated to one temperature and absorbs gas when heated to a second temperature, heater means associated with said reservoir means and positioned to heat said material, and means for selectively energizing said heater means as desired to heat said material to a selected one of said first and second temperatures thereby respectively releasing gas from said reservoir into said chamber and removing gas from said chamber, whereby the rate of heat transfer through the said chamber between the interior and exterior of said container can be varied.

2. A container having variable thermal conductance between its interior and its exterior comprising a double wall forming a sealed chamber, gas reservoir means, controlled means for releasing gas from said reservoir into said chamber and for removing substantially all gas from said chamber, and means for controlling said controlled means, whereby the rate of heat transfer through the said chamber between the interior and exterior of said container can be varied from good conduction to substantially no conduction.

3. A container having variable thermal conductance between its interior and its exterior comprising a double wall forming a sealed chamber, gas reservoir means, controlled means for releasing gas from said reservoir into said chamber and for removing gas from said chamber, means for controlling said controlled means, and means for indicating the pressure of the gas in said chamber whereby the rate of heat transfer through the said chamber between the interior and exterior of said container can be varied in a known manner.

4. A container having variable thermal conductance between its interior and its exterior comprising a double wall forming a sealed chamber, a gas reservoir unit mounted in said chamber and formed of material which will absorb hydrogen when heated to one temperature range and will emit hydrogen when heated to a second temperature range, a quantity of hydrogen contained in the material of said unit, heater means positioned to heat said unit, and means for energizing said heater means.

5. A container having variable thermal conductance between its interior and its exterior comprising a double wall forming a sealed chamber, a gas reservoir unit mounted in said chamber and formed of material which will absorb hydrogen when heated to one temperature range and will emit hydrogen when heated to a second temperature range, a quantity of hydrogen contained in the material of said unit, heater means positioned to heat said unit, means for controlling said heater means, and means for indicating the gas pressure in said chamber.

6. A container having variable thermal conductance between its interior and its exterior comprising a double wall forming a sealed chamber, a gas reservoir unit mounted in said chamber and formed of material which will absorb hydrogen when heated to one temperature range and will emit hydrogen when heated to a second temperature range, a quantity of hydrogen contained in the material of said unit, heater means positioned to heat said unit, means for controlling said heater means, and ionization gauge means for indicating the gas pressure in said chamber and removing gas from said chamber.

7. A container having variable thermal conductance between its interior and its exterior comprising a double wall forming a sealed chamber, a gas reservoir unit mounted in said chamber and formed of material selected from the group consisting of titanium and zirconium, a quantity of hydrogen contained in the material of said unit, heater means positioned to heat said unit, and means for energizing said heater means.

8. Apparatus for radioactivity well logging, said apparatus comprising of a subsurface instrument having a pressure resistant housing, a double-walled vacuum flask mounted in said housing, said flask having an inner chamber, a scintillation phosphor located in said inner chamber, a photomultiplier tube located in said inner chamber and optically coupled to said phosphor, a thermal mass located in said inner chamber to maintain said phosphor and said photomultiplier tube at a substantially constant temperature, gas reservoir means communicating with the space between the walls of said vacuum flask, a quantity of gas contained in said reservoir, regulating means for releasing gas from said reservoir into said space and for evacuating gas from said space into said reservoir, a surface unit located at the surface of the earth, a cable for suspending said subsurface instrument in a borehole to be logged and for transmitting electrical signals between said subsurface instrument and said surface unit, means located in said surface unit for receiving signals from said photomultiplier tube, and means for controlling said regulating means.

9. Apparatus for radioactivity well logging, said apparatus comprising a subsurface instrument having a pressure resistant housing, a double-walled vacuum flask mounted in said housing, said flask having an inner chamber, a scintillation phosphor located in said inner chamber, a photomultiplier tube located in said inner chamber and optically coupled to said phosphor, a thermal mass located in said inner chamber to maintain said phosphor and said photomultipler tube at a substantially constant temperature, means thermally sealing said inner chamber, a tube mounted in the space between the walls of said vacuum flask and formed of a material which will emit gas when heated to one temperature range and will absorb gas when heated to a second temperature range, a quantity of gas contained in the material of said tube, filament means positioned to heat said tube, means for supplying electrical current to said filament to cause said filament to heat said tube, ion gauge means located in said space to measure the gas pressure in said space, a surface unit located at the surface of the earth, a cable for suspending said subsurface instrument in a borehole to be logged and for transmitting electrical signals between said subsurface instrument and said surface unit, means located in said surface unit for receiving signals from said photomultiplier tube and said ion gauge, and means located in said surface unit for controlling the current supplied to said filament.

References Cited in the file of this patent

UNITED STATES PATENTS

| 2,513,749 | Schilling | July 4, 1950 |
| 2,528,547 | Reilly et al. | Nov. 7, 1950 |
| 2,908,823 | Ely | Oct. 13, 1959 |
| 2,998,523 | Muench et al. | Aug. 29, 1961 |

FOREIGN PATENTS

| 538,562 | Germany | Nov. 16, 1931 |